United States Patent [19]
Goldman

[11] Patent Number: 5,788,218
[45] Date of Patent: Aug. 4, 1998

[54] DAMPER SYSTEM WITH EDGE SEALED DAMPER BLADE AND METHOD OF ASSEMBLY

[75] Inventor: Wayne E. Goldman, Morrisville, Vt.

[73] Assignee: Fab-Tech Incorporated, Colchester, Vt.

[21] Appl. No.: 779,864

[22] Filed: Jan. 3, 1997

Related U.S. Application Data

[63] Continuation-in-part of Ser. No. 633,962, Apr. 19, 1996, abandoned.
[51] Int. Cl.$^6$ .............................................. F16K 1/22
[52] U.S. Cl. ......................... 251/306; 251/305; 137/15
[58] Field of Search ........................... 251/305, 306; 137/15

[56] References Cited

U.S. PATENT DOCUMENTS 3,837,616  9/1974  Castriota-Scanderberg ........ 251/306 X
4,674,528  6/1987  Nishio et al. ........................ 251/306 X

*Primary Examiner*—John Fox
*Attorney, Agent, or Firm*—Richard J. Birch

[57] ABSTRACT

A damper system has a rotatable, damper blade with a peripheral extending generally U-shaped channel edge seal fitted over the damper blade's peripheral edge. The channel edge seal comprises two edge seal members that are held together in tension by two retainers through which extend the damper blade shafts.

8 Claims, 4 Drawing Sheets

DAMPER SYSTEM WITH EDGE SEALED DAMPER BLADE AND METHOD OF ASSEMBLY

CROSS-REFERENCE TO RELATED APPLICATION

The present application is a Continuation-in-Part of application Ser. No. 08/633,962 filed Apr. 19, 1996, by Wayne E. Goldman for "DAMPER SYSTEM AND METHOD OF ASSEMBLY" now abandoned.

BACKGROUND OF THE INVENTION

1. Field of the Invention

The present invention relates to damper systems in general, and more particularly, to a damper system and method of assembly which employs an edge sealed damper blade.

2. Background Information

Damper systems for controlling fluid flow are well known in the art. These damper systems are often used under deleterious environmental conditions. Fume exhaust systems can be required to handle highly corrosive and toxic fumes. Dampers in such exhaust systems must be able to withstand such environmental conditions. The damper system components typically are coated with a protective coating, such as, a fluropolymer.

The above-mentioned parent application, which is incorporated herein by reference, discloses a mounting system for the damper blade with all of the components being resistive to the fluids, generally gases, controlled by the damper system.

The operational effectiveness of the damper system in the closed position depends upon the tightness of the damper blade seal with respect to the damper body. In addition, the damper blade-damper body sealing surfaces should be resistant to the fluids controlled by the damper system.

SUMMARY OF THE INVENTION

A damper system and method has a rotatable damper blade with a peripherally extending, generally U-shaped channel edge seal fitted over the damper blade's peripheral edge. The channel edge seal is formed in two portions that are retained together in tension by two retainers through which extend the damper blade shafts. Preferably, the damper blade edge seal is formed from a fluropolymer.

DESCRIPTION OF A PREFERRED EMBODIMENT

Figure 1:
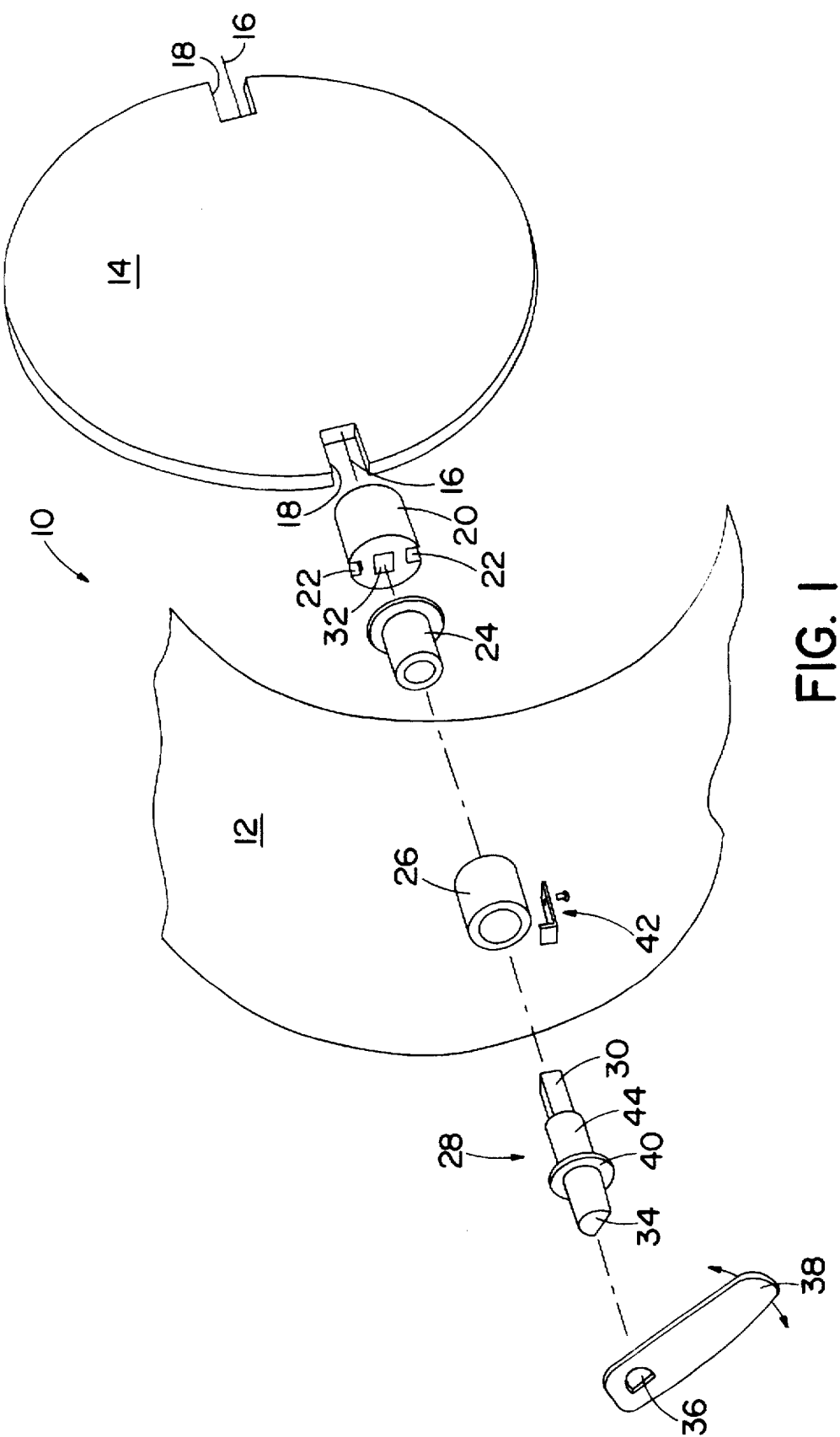
FIG. 1 is an exploded view of a damper system and duplicates the single Figure of the above-mentioned parent application.

Turning now to FIG. 1, which duplicates the single Figure of the above-mentioned parent application, there is shown in exploded, perspective view a damper assembly indicated generally by the reference numeral 10. The damper assembly 10 comprises a hollow damper body 12, a portion of which is illustrated in FIG. 1, and a rotationally mounted damper blade 14. The rotational axis 16 extends through opposed notches 18 that extend inwardly from the periphery of damper blade 14. A female socket 20 having opposed channels 22 is slid into the notch 18 with channels 22 fitted over the damper blade 14 so that the socket is held in the notch.

Flange bearing 24 extends into a bushing 26 that is mounted on the damper body 12. A shaft, indicated generally by the reference numeral 28, has a keyed end 30 that fits within bore 32 of the female socket 20. The other end 34 of shaft 28 is also keyed to fit within a "D-slot" 36 formed in an actuator arm 38. Shaft 28 includes a shaft retainer washer 40 that is held by a shaft retainer assembly 42. This configuration prevents movement of shaft 28 along the rotational axis 16 of the damper blade 14 while permitting the actuator arm 38 to rotate shaft 28 and thereby damper blade 14. The damper blade itself can be either circular or elliptical with the latter being preferred.

It will be appreciated that for purposes of simplicity, the corresponding female socket 20, flange bearing 24, bushing 26, shaft 28, washer 40 and shaft retainer assembly 42 for the right hand portion of the drawing have been omitted.

The damper blade 14 and shaft 28 at portion 44 can be coated with a suitable material, such as a fluropolymer, e.g., TEFLON, to resist the negative effects of fluids passing through the damper assembly. The female socket 20 can be constructed from resistive materials such as, a glass reinforced fluropolymer e.g., TEFLON or TEFZEL or from a ceramic.

If coating is desired, coating of the damper assembly is performed before the components are assembled together. The "slide on" female sockets are inserted into the corresponding notches before positioning the damper blade in the damper body. Subsequent assembly of the parts follows the exploded view of FIG. 1.

Figure 2:
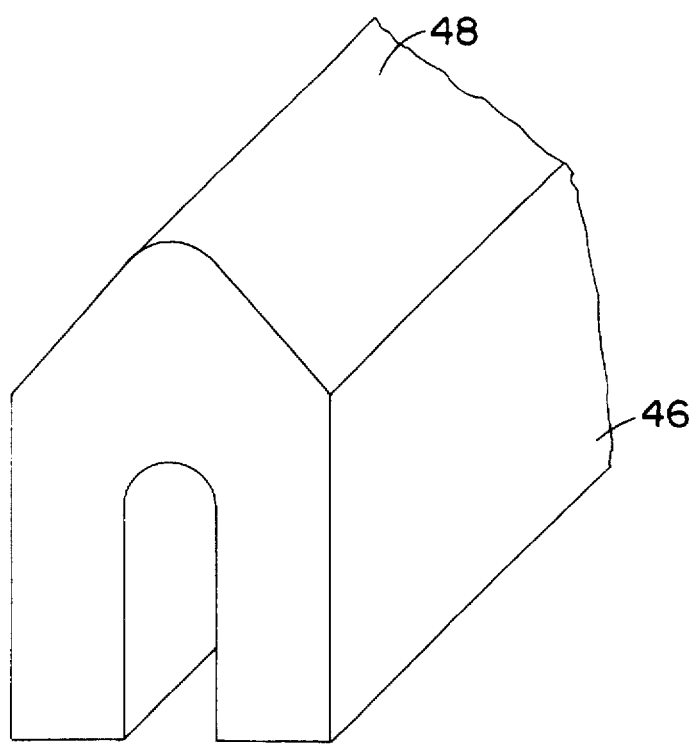
FIG. 2 is a perspective view of a portion of the damper blade edge seal.
Figure 3:
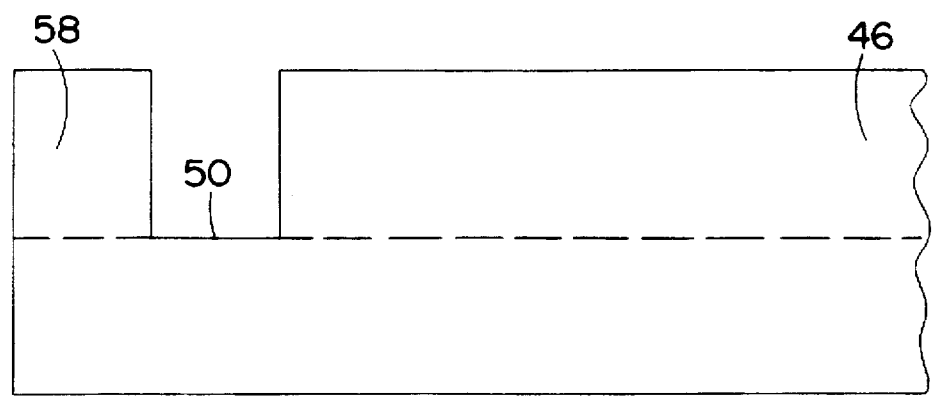
FIG. 3 is a view in side elevation of the damper blade edge seal after a notch has been cut in the end portion of the seal.

Referring now to FIGS. 2 and 3, there is shown in perspective view in FIG. 2 and in side elevation in FIG. 3, a portion of a generally U-shaped channel edge seal 46 for the damper blade 14. Preferably, the channel edge seal 46 is extruded from a fluropolymer e.g., TEFLON, although other corrosion resistant materials can be employed. The upper surface as shown in FIG. 2 is in the form of a curvilinear, cam-section 48.

The side elevational view of FIG. 3 illustrates the channel edge seal 46 after it has been cut to form a notch 50 at one end thereof. A similar notch is also cut in the other end of the channel edge seal 46 (not shown).

Figure 4A:
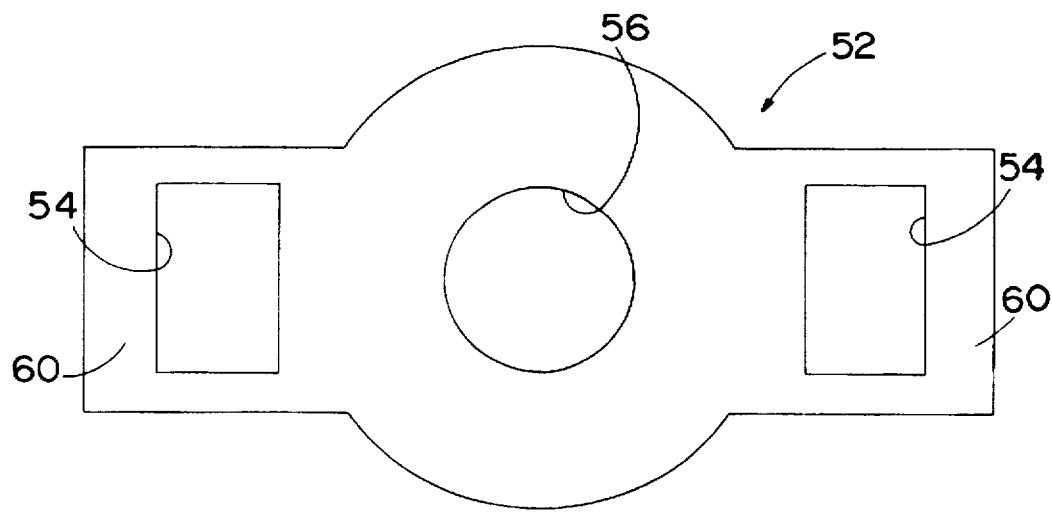
FIGS. 4A and 4B are plan and side elevation view, respectively, of a retainer that holds together the two sections of the damper blade edge seal; and, FIG. 5 is a partial view of the damper blade and damper blade edge seal showing the retainer about to engage the damper blade edge seal.
Figure 4B:
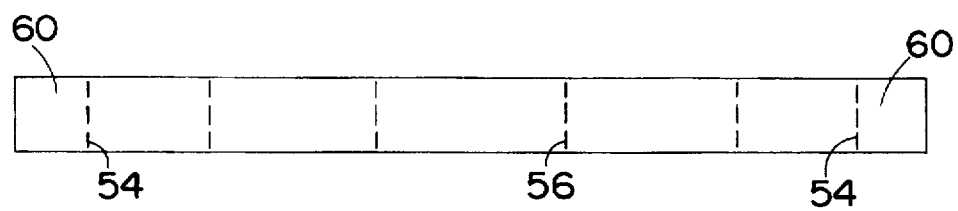

FIGS. 4A and 4B depict a retainer 52 having end apertures 54 and a central aperture 56. FIG. 4B depicts the retainer 52 in side elevation.

Figure 5:
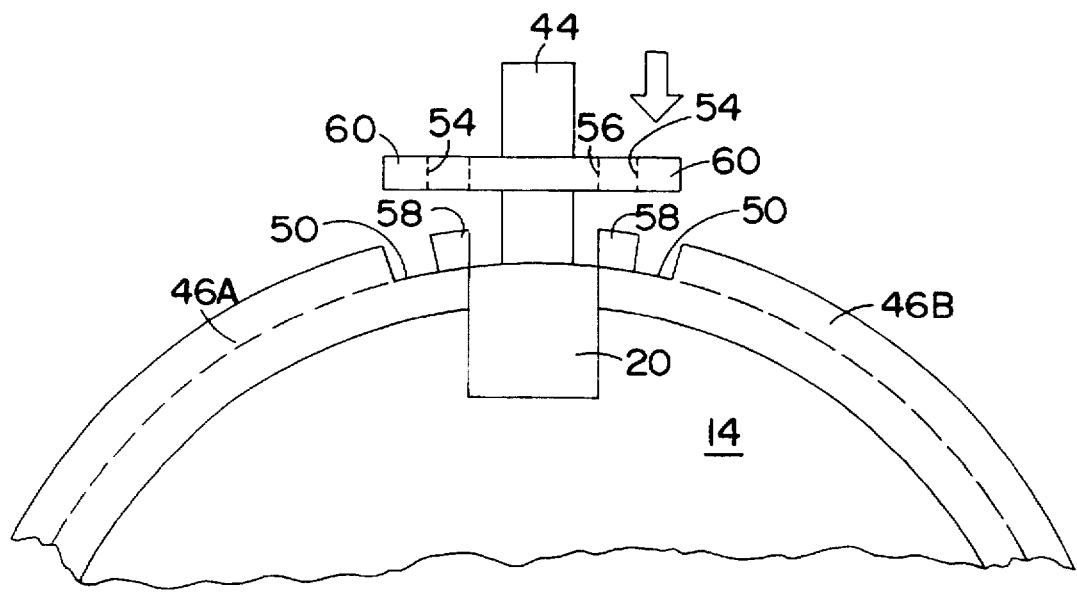

FIG. 5 illustrates the assembly process employed in securing the channel edge seals 46A and 46B to damper blade 14 by means of the retainer 52. Each end of the channel edge seals 46A and 46B have a male portion 58 which engages the corresponding notch 54 in retainer 52. Similarly, the male end portions 60 of retainer 52 engage the notch 50 formed in the channel edge seal 46A and 46B.

It will be appreciated that for purposes of simplicity, only one damper shaft 44 and the associated channel edge seal members 46A and 46B together with the retainer 52 have been shown in FIG. 5. A duplicate configuration is employed on the opposite damper blade shaft 44 (not shown in FIG. 5).

Preferably, the retainer 52 is also formed from a fluropolymer, e.g., TEFLON.

Although the retainer 52 has been depicted in FIGS. 4A, 4B and 5 as being flat, it assumes a curved configuration when it is placed in mating contact with the channel edge seal members 46A and 46B so that these elements are held in tension prior to assembling the damper blade 14 in damper body 12.

Having described in detail a preferred embodiment of my invention, it will now be obvious to those having ordinary skill in the art that numerous modifications can be made therein without departing from the scope of the invention as defined in the following claims.

What I claim and desire to protect by Letters Patent in the United States is:

1. A damper system comprising:

a damper body;

a damper blade pivotally mounted within said damper body, said damper blade having:

a peripheral edge, a peripheral edge seal comprising:

a first generally U-shaped channel member having two end portions and an intermediate portion, said first channel edge seal member being positioned around and encompassing within its generally U-shaped channel a portion of the periphery of said damper blade;

a second generally U-shaped channel edge seal member having two end portions and an intermediate portion, said second channel edge seal member having positioned around and encompassing within its generally U-shaped channel another portion of the periphery of said damper blade;

a first retainer connecting together one end of each of said first and second channel edge seal members along the periphery of the damper blade; and, a second retainer connecting together the other end of each of said first and second channel edge seal members along the periphery of the damper blade.

2. The damper system of claim 1 wherein said first and second channel edge seal members have male and female locking elements at each end portion thereof and wherein said first and second retainers have corresponding male and female locking elements that interlock with the male and female locking elements of the first and second channel edge seal members.

3. The damper system of claim 1 wherein said damper blade has first and second opposed damper blade shafts that extend outwardly from the periphery of the damper blade and through said first and second retainers, respectively.

4. The damper system of claim 1 wherein said damper blade is circular.

5. The damper system of claim 1 wherein said damper blade is elliptical.

6. The damper system of claim 1 wherein said first and second channel edge seal members are formed from a fluropolymer.

7. The damper system of claim 1 wherein said first and second channel edge seal members are formed from a corrosion resistant material.

8. A method for producing an edge seal on a damper blade comprising the steps of:

a) positioning a first generally U-shaped channel member having two end portions and an intermediate portion around and encompassing within its generally U-shaped channel a portion of the periphery of said damper blade;

b) positioning a second generally U-shaped channel edge seal member having two end portions and an intermediate portion around and encompassing within its generally U-shaped channel another portion of the periphery of said damper blade;

c) connecting together with a retainer one end of each of said first and second channel edge seal members along the periphery of the damper blade; and, d) connecting together with a second retainer the other end of each of said first and second channel edge seal members along the periphery of the damper blade.

\* \* \* \* \*